Figure 1:
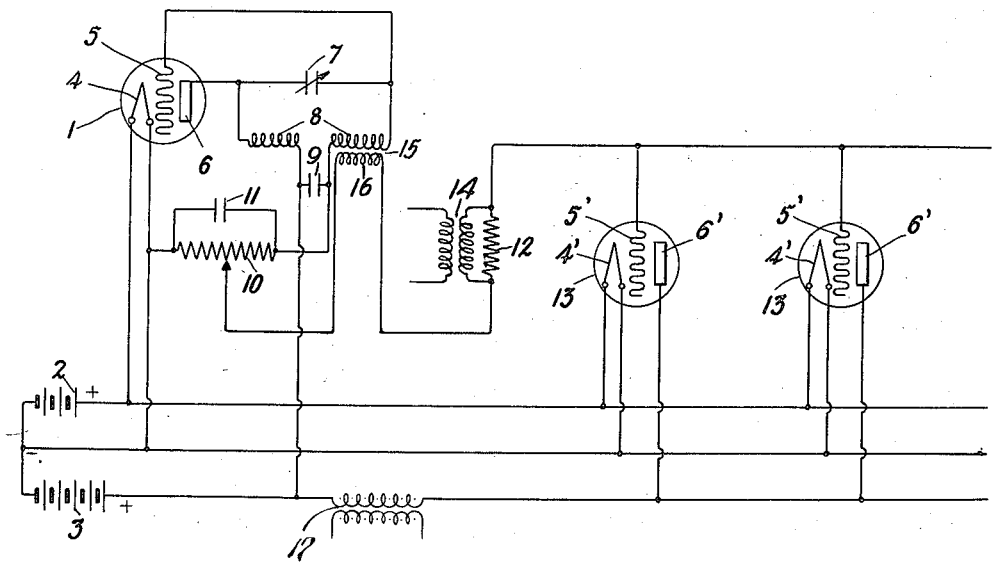

R. A. HEISING.
ELECTRIC DISCHARGE APPARATUS.
APPLICATION FILED OCT. 2, 1916.

1,413,732. Patented Apr. 25, 1922.

Inventor:
Raymond A. Heising.
by ᴅ. C. Hannel, Att'y.

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRIC DISCHARGE APPARATUS.

1,413,732.  Specification of Letters Patent. Patented Apr. 25, 1922.

Application filed October 2, 1916. Serial No. 123,353.

*To all whom it may concern:*

Be it known that I, RAYMOND A. HEISING, a citizen of the United States, residing at East Orange, in the county of Essex and State of New Jersey, have invented certain new and useful Improvements in Electric Discharge Apparatus, of which the following is a full, clear, concise, and exact description.

This invention relates to electric discharge apparatus and more particularly to apparatus employing discharge devices having cathode, anode and electrostatic control elements.

An object of the invention is to afford a means whereby one or more of a system of vacuum tubes of the audion type, or other equivalent devices, can be supplied with a negative voltage for the grid or other controlling means through the action of an oscillation generator system or its equivalent. In so obtaining a negative voltage for the grid or other controlling means, the necessity of using polarizing batteries or other sources of potential is eliminated. In a system for use on aeroplanes, this has an important advantage in simplifying the system and decreasing its weight. An even more important advantage resides in the superiority of systems of the kind herein described in maintaining a constant working voltage on the grids of one or more vacuum tubes of a system.

This object may be accomplished, for example, by providing an oscillation generator comprising a vacuum tube of the audion type suitably coupled to a capacity and an inductance, which oscillation generator produces on the grid or electrostatic control element of the tube, an alternating voltage of sufficient positive amplitude to cause current to flow from the grid to the heated member of the tube. In carrying out this object, the grid of the oscillating generator tube or tubes are caused to keep themselves at a negative working potential with respect to their associated cathode or cathodes. This advantage is an important one which may be had independently of the use of means for supplying electrodes external to the oscillation generator with working potentials.

In applying the invention, the current which flows between the cathode and the control grid of the oscillation generator, or its equivalent, is caused to flow through a resistance. The resulting drop of potential across the whole or a portion of this resistance serves as a source of unidirectional voltage for any desired system including the oscillation generator itself.

Other objects of the invention will be suggested to those skilled in the art by consideration of the following description. Certain parts of the described apparatus may be utilized in other systems. The novel combinations and arrangements believed to reside in the invention are defined in the appended claims.

Figure 2:
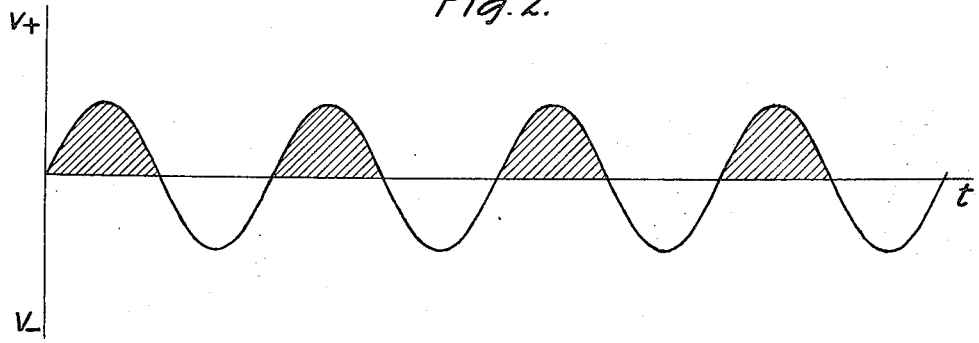

The nature of this invention can be more fully explained in connection with the drawings in which Fig. 1 represents one embodiment of this invention as exemplified in a radio-transmission apparatus and Fig. 2 shows a curve in which the potential of the grid with respect to the filament is plotted against the time.

In Fig. 1, 1 is a vacuum tube of the audion type in which 4, 5 and 6 are the filament, grid and anode plate, respectively. 2 and 3 are the batteries for the filament voltage and the output circuit. The tube 1, together with capacity 7 and inductance 8, constitutes an oscillation generator of a known type. The primary oscillation circuit of the generator consists of a capacity 7 and an inductance 8. The capacity 9 is also included for a purpose hereinafter mentioned. Since 4 and 5 are connected by a metallic circuit, they tend to remain in general, at the same potential, but the production of oscillations in the oscillation circuit causes the grid to be alternately positive and negative with respect to the filament. This is shown by the curve of Fig. 2 in which the potential V of the grid with respect to the filament is plotted against the time $t$. When the grid is at a lower potential than the filament, as represented by the unshaded portion of Fig. 2, no current can flow between the two electrodes. But when the grid is at a higher potential than the filament, as shown by the shaded portion, a unidirectional pulsating current is produced, flowing from the grid to the filament through the external metallic circuit. This metallic circuit contains a resistance 10 and capacity 11 whose functions will be described later. 9 is a capacity shunted across the terminals of battery 3 and offers an easier path than the battery 3 for the oscillations in this circuit. Each time the grid becomes positive a certain number of negative electrons will flow to the grid while when the grid becomes negative substantially no electrons will pass from the grid to the filament or vice versa. This results in the filament 4 acquiring a certain positive potential with respect to the grid 5, which potential will receive an added increment with each oscillation until the rate of leakage through the resistance 10 to the grid 5 becomes equal to the average rate of acquiring electricity by carrier electrons because of the received increments mentioned. The condenser 11 acts as a storage reservoir tending to smooth out the pulsating current between the grid 5 and filament 4 into a substantially uniform direct current through the resistance 10. Consequently, we have a substantially uniform fall of potential across resistance 10 due to this pulsating current between the grid and filament. This fall of potential may be used, as shown in the drawing, as a source of negative voltage for the grids 5' included in the system of vacuum tubes 13. 12 is a resistance and 14 a transformer by means of which the signals to be transmitted may be impressed on the input circuit of this system of tubes. The system of tubes 13 have in their output circuit a transformer 17, by means of which the signals to be transmitted are impressed upon a suitable signaling conductor. The tubes 13 receive their high or carrier frequency from the oscillating system by means of the transformer 15, the secondary 16 being included in the input circuit of the vacuum tube system 13, while part of the inductance 8 is used for its primary. 4' and 6' are the usual heated member and anode plate. This system of vacuum tubes may, as shown in the figure, and preferably do receive their filament and output circuit voltage from the same batteries as the vacuum tube in the oscillating circuit, but the sources may be entirely separate.

The arrangement shown is illustrative only and it will be possible for those skilled in the art to devise various modifications embodying the invention, as expressed in the appended claims.

What is claimed is:

1. In combination, a vacuum tube having a control electrode and a cathode, means associated with said tube whereby the control electrode is alternately positive and negative with respect to the said cathode, a circuit connected to said control electrode and said cathode, through which current flows when the said control electrode is positive, a resistance exterior to said tube in said circuit, means for tending to cause the current through said resistance to be uniform and constant, a second vacuum tube having a control electrode and another electrode, said control electrode being connected to one point of said resistance and said other electrode being connected to another point thereof.

2. In combination, an oscillation generator comprising a vacuum tube of the audion type, an inductance and a capacity, said inductance and capacity constituting an oscillation circuit, a source of current for said generator, a second vacuum tube having a control electrode and a cathode, and means including conductors connecting said tubes whereby the alternating voltage existing across a part of said circuit tends to cause a substantially constant potential difference between said control electrode and said cathode.

3. The combination of an oscillation generator comprising an oscillation circuit and a vacuum tube, an anode, a cathode and an impedance varying element for said tube, a resistance, means whereby the alternating voltage resulting from said oscillation generator is partially utilized through the agency of said vacuum tube to produce a unidirectional current, said unidirectional current passing through said resistance, and a capacity shunted around the said resistance and two elements which are desired to be kept at different potentials connected to different parts of said resistance.

4. The combination of an oscillation generator comprising an oscillation circuit and a vacuum tube, a cathode and an impedance varying element for said tube, a resistance, a second vacuum tube having a control electrode, a source of voltage for furnishing operating current to said generator, means whereby the alternating voltage resulting from said oscillation generator is partially utilized through the agency of said first-mentioned vacuum tube to produce a unidirectional current, said unidirectional current passing through a resistance, said control electrode being directly connected to a point in said resistance.

5. The combination of an oscillation generator comprising an oscillation circuit, a vacuum tube of the audion type and an input circuit containing a resistance, means wherby the alternating voltage resulting from said oscillation generator is partially utilized through the agency of said vacuum tube to produce a unidirectional current, said unidirectional current passing through said input circuit containing the resistance, and means associated with said resistance for causing the potential drop thereacross to be substantially uniform and constant.

6. A vacuum tube containing a filament, an anode and grid, an input circuit containing said filament and grid, a resistance in said input circuit, an oscillating circuit comprising a condenser and an inductance, the alternating current in said oscillating circuit periodically increasing the potential of said grid, thereby causing a pulsating current to flow in the input circuit through said resistance, and a second vacuum tube having two electrodes, one of said electrodes being connected to one point in said resistance and the other to another point.

7. A vacuum tube containing a cathode, an anode and a control electrode, a circuit containing said cathode and control electrode, a resistance in said circuit, an oscillating circuit comprising a condenser and an inductance, means associating said circuit with said control electrode whereby the alternating current in said oscillating circuit periodically increases the potential of said control electrode with respect to said cathode, thereby causing a pulsating current to flow in the said first-mentioned circuit through said resistance, an element connected to one point of said resistance, and another element to another point so that one of said elements will be constantly maintained at a lower potential than the other.

8. A vacuum tube containing a cathode, an anode and a control electrode, a circuit containing said cathode and control electrode, a resistance in said circuit, an oscillating circuit comprising a condenser and an inductance, means associating said circuit with said control electrode whereby the alternating current in said oscillating circuit periodically increases the potential of said control electrode with respect to said cathode, thereby causing a pulsating current to flow in the said first-mentioned circuit through said resistance, a second vacuum tube having a cathode and a control electrode, said cathode and control electrode being respectively connected to different points of said resistance.

9. The combination with an oscillation generator of the audion type, of a discharge device associated therewith having an electrode and a control element, a resistance leakage path in said oscillation generator, one point in said path being connected to said electrode and a second point being connected to said control element, and means for reducing the potential difference variations induced in said path by said generator whereby a relatively constant potential is applied to said control element.

10. The combination with an oscillation generator of the audion type, of a discharge device associated therewith having an electrode and a control element, and a resistance leakage path in said oscillation generator, one point in said path being connected to said electrode and a second point being connected to said control element.

11. In combination, an oscillation circuit, a discharge device having a cathode, an anode and an impedance-varying element, a lead from said anode and from said impedance-varying element to points in said oscillation circuit, the difference in potential between said points being alternately large and small, a lead from said cathode to a point in said oscillation circuit having a potential which is at all times between the potentials of the first-mentioned points, and a resistance in said last-mentioned lead for controlling the discharge of electricity from said impedance varying element.

12. In combination, an oscillation circuit, an evacuated discharge device having a cathode, an anode and an impedance-varying element, a lead from said anode and from said impedance-varying element to points in said oscillation circuit, the difference in potential between said points being alternately large and small, a lead from said cathode to a point in said oscillation circuit having a potential which is at all times between the potentials of the first-mentioned points, and a resistance having a capacity in shunt thereto in said last-mentioned lead, said impedance-varying element being insulated from said anode except for the connection through said resistance.

13. In combination, an inductance, a discharge device having an anode, a cathode and a grid, a lead from said cathode to a point in said inductance, a lead from said anode to said inductance, a lead from said grid to said inductance, an electric capacity in effective shunt to at least a portion of said inductance including at least a portion of that part of said inductance which lies between the leads from said cathode and said anode, and a leak resistance in said first-mentioned lead for controlling the discharge of electricity from said grid.

14. In combination, an inductance, a discharge device having an anode, a cathode and an internal grid, a lead from said cathode to a point in said inductance, a lead from said anode to said inductance, a lead from said grid to said inductance, an electric capacity in effective shunt to at least a portion of said inductance including at least a portion of that part of said inductance which lies between the leads from said cathode and said anode, and a grid leak resistance having a capacity in shunt thereto in said first-mentioned lead.

15. In combination, a plurality of space discharge repeaters each having an anode, a cathode and an impedance controlling element, separate sources of waves to be repeated connected to the input circuits of said repeaters, and a circuit including a resistance connected between the impedance controlling element and the cathode of one of said repeaters, the impedance controlling element and the cathode of another of said repeaters being connected to different points respectively of said resistance.

16. A plurality of space discharge repeaters each having a cathode and an impedance controlling element, separate sources of waves to be repeated separately connected to said repeaters, a path from the impedance controlling element of each repeater to the cathode thereof, and a resistance common to said paths.

17. In combination, a plurality of space discharge repeaters each having an anode, a cathode and an impedance controlling element, conductive paths between the impedance controlling elements of said repeaters and the corresponding cathodes thereof, a substantially non-inductive resistance, said paths including said resistance, and a path from the cathode to the anode of one of said repeaters including said resistance.

18. The combination with an oscillation generator of the three-electrode discharge device type, of a discharge device associated therewith having an electrode and a control element, a resistance leakage path included in said oscillation generator, one point in said path being connected to said control element, and means for reducing the variations of potential difference induced in said path by said generator whereby said control element is maintained at a relatively constant potential with respect to said electrode.

19. In combination, a space discharge device having an anode, a cathode and an impedance varying element, circuit arrangements connected thereto whereby said device functions as an oscillation generator, a space discharge repeater, alternating current output circuits for said device and said repeater having no impedance elements common thereto, connections between said device and said repeater whereby said repeater repeats waves produced by said device, a common electrical source for heating said cathodes, and a common space current supply for said device and said repeater.

20. In combination, a plurality of space discharge repeaters each having an anode, a cathode and an impedance varying element, separate alternating current output circuits therefor, circuit arrangements whereby one of said repeaters functions as a generator of carrier oscillations, connections for impressing the generated oscillations upon the input circuit of another of said repeaters, means connected to said input circuit for causing signaling variations, and a common source of space currents for said repeaters.

21. In combination, a plurality of space discharge repeaters having separate alternating current output circuits, circuit arrangements whereby one of said repeaters functions as an oscillation generator, connections for impressing the generated oscillations upon the input circuit of another of said repeaters, a separate source of waves, connections for impressing said waves upon said other repeater, and a common space current source for said repeaters.

In witness whereof, I hereunto subscribe my name this 29th day of September A. D., 1916.

RAYMOND A. HEISING.